United States Patent [11] 3,572,900

[72] Inventor Edmund L. Bouché
Lexington, Mass.
[21] Appl. No. 820,181
[22] Filed Apr. 29, 1969
[45] Patented Mar. 30, 1971
[73] Assignee Technical Operations, Incorporated
Burlington, Mass.

[54] COLOR TV FILM REPRODUCTION SYSTEM COMPATIBLE WITH DIFFRACTION PROCESS COLOR PROJECTION SYSTEMS
11 Claims, 22 Drawing Figs.

[52] U.S. Cl. .......... 350/162SF, 95/12.2, 178/5.4TC, 353/31
[51] Int. Cl. .......... G02b 27/38
[50] Field of Search .......... 350/162, 162 (SF); 178/5.4 (OTC); 355/32, 71; 95/12.2

[56] References Cited
UNITED STATES PATENTS

| | | | |
|---|---|---|---|
| 3,504,606 | 4/1970 | Macovski | (350/162SF)UX |
| 2,129,195 | 9/1938 | Bocca et al. | (350/162SF)UX |
| 3,314,052 | 4/1967 | Lohmann | (350/162SF)UX |
| 3,378,633 | 4/1968 | Macovski | (350/162SF)UX |
| 3,421,809 | 1/1969 | Lohmann | 350/162 |
| 3,488,190 | 1/1970 | Smith | (350/162SF)UX |

*Primary Examiner*—John M. Corbin
*Attorneys*—Rosen and Steinhilper and John H. Coult

ABSTRACT: This disclosure depicts methods and apparatus for improving the fidelity of displays produced by diffraction process color recording and reconstruction systems. More particularly, the disclosure concerns color TV film reproduction systems which are capable of displaying with enhanced fidelity either conventional color transparency cine film, or alternatively, monochrome cine records in which color information is stored on spatial carriers. The illustrated systems and methods involve, inter alia, predetermining the azimuthal orientation of color-encoding spatial carriers and decoding filter means in order to suppress moiré patterns and minimize color distortions in color displays.

Edmund L. Bouché
*Inventor*
*By* Rosen & Steinhilper
and
John H. Coult
*Attorneys*

Edmund L. Bouché
*Inventor*
*By* Rosen & Steinhilper
and
John H. Coult
*Attorneys*

Edmund L. Bouché
*Inventor*
*By* Rosen & Steinhilper
and
John H. Coult
*Attorneys*

Edmund L. Bouché
*Inventor*
By Rosen & Steinhilper
and
John H. Coult
*Attorneys*

COLOR TV FILM REPRODUCTION SYSTEM COMPATIBLE WITH DIFFRACTION PROCESS COLOR PROJECTION SYSTEMS

BACKGROUND OF THE INVENTION

This application concerns principles useful in the application of a particular diffraction process color system to commercial color television film reproduction systems. Diffraction process color systems have been investigated sporadically for many years. Carlo Bocca in his U.S. Pat. No. 2,050,417 (1936) describes a system wherein color separation diapositives are made with spatial carriers at different angles; the diapositives are then added on a common recording medium. Color information is retrieved from the colorless record thus formed by optically Fourier-transforming the record and spectrally filtering the first order diffraction patterns consonant with the color separation information they carry. The patent states that upon retransformation of the Fourier transform distribution, a full-color aerial image is erected.

More recently, others have reinstigated studies of diffraction process color systems, as evidenced for example by U. S. Pat. Nos. 3,378,633 and 3,378,634, issued in Apr. of 1968 to Albert Macovski; however, I am not aware of any diffraction process system that has been introduced commercially.

The following are among the many problems which have been encountered during the development of diffraction process systems: (1) color scene reconstructions produced by diffraction process systems are susceptible to color distortions caused by scene edges and periodic patterns acting as false color-encoding elements; and (2) nonlinearities occurring in certain recording processes may result in moiré patterns which degrade the fidelity of reconstructed images.

OBJECTS OF THE INVENTION

It is a principal object of this invention to provide improved diffraction process color systems and methods which minimize the described color distortions and moiré effects.

Further objects and advantages of the invention will in part be obvious and will in part become apparent as the following description proceeds. The features of novelty which characterize the invention will be pointed out with particularity in the claims annexed to and forming a part of this specification.

BRIEF DESCRIPTION OF THE DRAWINGS

For a fuller understanding of the invention, reference may be had to the following detailed description taken in connection with the accompanying drawings wherein:

FIGS. 1—6 depict preferred implementations of the inventive concepts. However, before describing the invention, in order that it may be better understood, a brief discussion of the general nature of the diffraction process information storage and retrieval methods and structures with which this invention is involved, and the nature of the problems which exist in prior art display apparatus, will be engaged.

FIG. 7 shows in very schematic form a photographic camera 10 which might be employed to form a spectral zonal spatially periodically modulated photographic record. The record may be formed as a composite of three separate color separation exposures of a photosensitive film 12 in the camera 10. The separate color separation records thus formed are respectively associated with a spatial periodic modulation, imposed for example, by a diffraction grating 16 adjacent the film 12, which is unique in terms of its relative azimuthal orientation.

FIG. 7 depicts the first step of a multistep operation for forming such a composite record. An object 14, illustrated as having areas of predominantly yellow, green, blue, and red spectral reflectance characteristics, as labeled, is photographed through a filter 18 having a spectral transmittance peak in the red region of the visible spectrum. A grating 16 having a line orientation sloping, for example, at 30° to the horizontal, from upper right to lower left (as the grating would appear if viewed from the back of the camera), is juxtaposed with the film 12 to effect a superposition of a shadow image of the grating 16 on the red light image of object 14. The resulting color separation record 19 associated with the red content in the object 14, processed to a positive, for example, by reversal processing techniques would appear as shown in FIG. 8A. The object appears inverted, of course, because of the property of the objective lens of rotating the image 180°. It is seen from FIG. 1A that the grating modulation is superimposed upon the object detail associated with light having a red spectral content. Note that because of the red constituent of yellow light, the yellow area in the object 14 is also imaged with superimposed grating lines of like angular orientation.

Figures 7, 8A, 8B, 8C, 8D, 9, 10, 11:
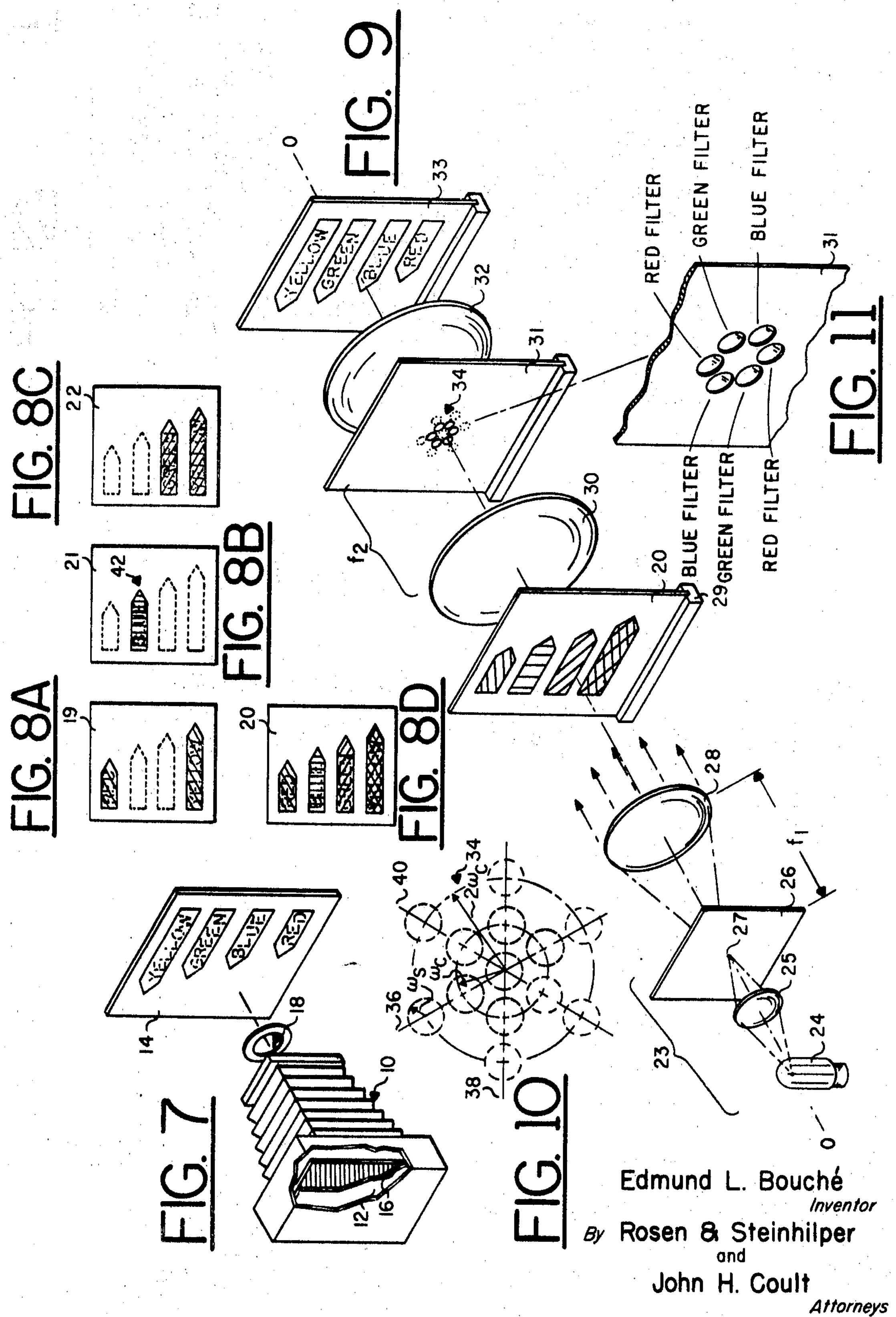
FIG. 7 is a distorted scale schematic perspective view of a colored object and photographic camera which might be used for forming photographic records of the object in accordance with the diffraction process spectral zonal photography; the view shows the camera partially broken away to reveal a photographic recording material and a diffraction grating which would be otherwise hidden within the interior of the camera.
FIGS. 8A—8D show individual and composite color separation records of the object being photographed, each of the individual records being associated with a particular zone of the visible spectrum and with a periodic modulation distinctive by its relative azimuthal orientation.
FIG. 9 is a distorted scale schematic perspective view of a prior art projection display apparatus for displaying photographic records of the above-described type.
FIG. 10 is a front elevation view, schematic and grossly simplified for ease of understanding, of a Fraunhofer diffraction pattern which might be formed in a Fourier transform space in the apparatus of FIG. 9.
FIG. 11 is a schematic view, enlarged and partially broken away, of a spatial and spectral filter shown in FIG. 9.

To complete the formation of a composite photographic record, as shown in FIG. 8D at 20, color separation exposures are then made successively through a filter having a spectral transmittance characterized by a blue dominant wavelength with a diffraction grating oriented vertically, and then finally through a filter having a spectral transmittance dominant in the green region of the spectrum with a diffraction grating having a grating orientation sloping from the upper left to lower right, for example, at 30° to the horizontal.

It is seen from FIG. 8B that the blue color separation record 21 does not result in the exposure of any part of the film 12 not associated with blue content in the object 14; however, upon exposure to the object 14 through a green filter, the yellow area is again exposed with grating image superimposed thereon with an orientation associated with the green color separation record 22. (See FIG. 8c.) Thus, as shown in FIG. 8D, the object area having yellow spectral content has superimposed thereon spatially periodic modulations associated with both the red and green color separation records.

Apparatus for displaying such a photographic record is known to the prior art and may take the form shown in FIG. 9. Such display apparatus includes a source 23 of light which is coherent at the record at the selected modulation frequency, illustrated as comprising an arc lamp 24, a condenser lens 25, and a mask 26 having an aperture 27 of restricted diameter. A lens 28 is provided for effectively transporting the point light source formed to a far field, either real or virtual. A film holder 29 for supporting a transparency record to be displayed, a transform lens 30 (explained below), a Fourier transform filter 31 (explained below), a projection lens 32, and a display screen 33 complete the display apparatus.

Upon illumination of composite record 20 in film holder 29, there will be produced three angularly displaced multiorder diffraction patterns, collectively designated by reference numeral 34 in FIG. 10. Each of the component diffraction patterns associated with a particular color separation record contains a zeroth order which is spatially coextensive with the zeroth order (undiffracted) components of each of the other patterns, and a plurality of higher order (diffracted) components each containing the related color object spatial frequency spectrum modulating a carrier having a frequency equal to a multiple of the grating fundamental frequency, the value of the multiple being a function of the diffraction order m.

By the use of transform lens 30 these diffraction patterns are formed within the confines of the projection system in a space commonly known as the Fourier transform space. It is thus termed because of the spatial and temporal frequency analysis which is achieved in this plane by diffraction and interference effects. Through the use of spatial and spectral filtering of these patterns in the transform plane, one or more of the discrete color separation records may be displayed. If all three color separation records are retrieved simultaneously, for example, a reconstitution of the original scene in true color is achieved.

The nature of the Fourier transform space and the effects that may be achieved by spatial filtering alone or by spatial and spectral filtering in this space of a selected diffraction order or orders may be understood by reference to FIG. 10. FIG. 10 shows three angularly separated diffraction patterns corresponding to the red, green, and blue light object spatial frequency spectra lying along axes labeled 36, 38, and 40, respectively. Each of the axes 36, 38 and 40 is oriented orthogonally to the periodic modulation on the associated color separation record. The diffraction patterns share a common zero order but have spatially separated higher orders.

By nature of diffraction phenomena, the diffraction angle $\alpha$ is $$\alpha=\lambda\,\omega$$

where $\lambda$ represents the spectral wavelength of the illumination radiation and $\omega$ represents spatial frequencies. Assuming the light at the film gate 29 to be collimated, the diffraction orders will be formed in the transform space at the delta function positions determined by the transform of the record modulation at radial distances from the pattern axis;

$$R=f_2\, m\omega_c\bar{\lambda}$$

where $f_2$ is the focal length of lens 30; $\bar{\lambda}$ is the mean wavelength of the illuminating radiation; $m$ represents the diffraction order; and $\omega_c$ is the fundamental grating frequency.

It should be understood that the FIG. 10 illustration of the diffraction patterns which might be formed is a gross simplification. In the interest of clarity and ease of understanding, the delimitation of the various diffraction orders has been represented as being circular. In reality, of course, the orders have no finite outline in transform space. The outer boundaries indicated are merely isophotic lines connecting points of like energy level. In the real situation, the shape of the isophotic lines is determined by the light source shape, the envelope of the grating elements, and the scene or object recorded.

The first orders of each of the diffraction patterns can be considered as being an object spatial frequency spectrum of maximum frequency $\omega_s$ (representing a radium of the order) convolved with a carrier of spatial frequency $\omega_c$. The second order components can be thought of as being the convolution of an object spectrum having a maximum spatial frequency $\omega_s$ with a carrier having a spatial frequency of $2\omega_c$, and so forth. Thus, the various orders of each diffraction pattern may be thought of as being harmonically related, with a spatial frequency $\omega_c$, or an even multiple thereof, acting as a carrier for the spectrum of spatial frequencies characterizing the object detail. Two orders only are shown; however, it should be understood that even higher orders are present, but will be of increasingly less intensity.

Spatial filtering of the diffraction pattern is achieved by placing the apertured transform filter 31 in the transform space, as shown in FIG. 9. Since the zeroth order components of the diffraction patterns are spatially coextensive, the spatial frequencies contained in the zeroth order information channel represents the sum of the spectra respectively associated with each of the color separation records 19, 21, and 22. Thus, an opening in the transform filter 31 at the zeroth order location would result in a composite image of object 14 being formed in black, white, and tones of grey. Because the information channels associated with each of the color separation records are inseparably commingled in the zeroth order, they cannot be properly recolored to effect a faithful color reproduction of the photographed object. However, at the higher orders, because of the angular displacement of the red, blue, and green associated axes 36, 38, and 40, the proper spectral characteristic may be added to each of the information channels by appropriate spectral filtering.

FIG. 11 represents an enlargement of a central portion of filter 31, illustrating appropriate spatial filtering apertures with the correct spectral filters to effect a true color reproduction of the object. It should be understood, of course, that higher order components, appropriately spectrally filtered, could also be passed if desired. However, to maintain the discussion at a fundamental level, utilization of only the first order diffraction components has been illustrated.

Consider now a trace of the projection illumination as it traverses the projection system. The lamp 24 and condenser lens 25 are designed to evenly illuminate aperture 27 in mask 26 with a beam of maximum intensity broadband luminous energy. Lens 28 is shown spaced axially from mask 26 a distance substantially equal to its focal length in order that the light illuminating the film gate is substantially collimated. Transform lens 30 collects the substantially planar wavefronts in the zeroth order and diffracted higher orders and brings them to a focus in transform space in or near the aperture of the projection lens 32. The lenses 28 and 30 may be thus thought of as cooperating to image the illuminated aperture 27 in mask 26 on the transform filter 31.

It is evident that by prior art methods and apparatus, the display photographic records of the above-described type is hampered by the low levels of image brightness which may be obtained. One reason for the low image luminance concerns the requirement that the effective source must not exceed a predetermined maximum size to prevent overlap, and thus "-crosstalk" between the diffraction orders. It is seen that the center of each of the higher orders of a diffraction pattern is spaced radially from the pattern axis by an integral multiple of the carrier frequency $\omega_c$ and that the radius of each of the orders corresponds to spatial frequency $\omega_s$. To prevent overlap between the zeroth and higher orders, $\omega_c$ must be greater than, or at least equal to $2\omega_s$. (This may be thought of as a version of the sampling theorem.) Since each diffraction order is an image of the illuminated aperture 27 in mask 26 magnified by the ratio $f_2/f_1$, it follows then that the diameter $d$ of the aperture 27 in mask 26, and thus the total light flux transmissible through the aperture 27, is constrained in accordance with the relationship (assuming collimated light at the film gate 29);

$$d=f_1\bar{\lambda}\omega$$

where $f_1$ represents the focal length of lens 28, and $\bar{\lambda}$ and $\omega_c$ are as indicated above.

The illuminance of the film gate by the collimator is:

$$E=\frac{Bd^2}{4f_1^2}\pi$$

where $B$ is the source photometric brightness (luminance) in candles/cm². Substituting for $d$ from above $$E=\frac{\pi B\bar{\lambda}^2\omega_c^2}{4}$$

This relation clearly illustrates that an increase in the brightness of displayed images can be obtained by previous techniques only at the cost of increasing the source brightness $B$ or the grating frequency $\omega_c$.

As suggested, the schematic representation in FIG. 10 of the diffraction pattern of the record spatial frequencies formed in transform space is vastly simplified. It will be understood that because of the dependence of the diffraction angle on both spatial frequency and the wavelength of the illuminating radiation, the radial displacement in transform space from the pattern axis of carrier frequencies is different for each illuminating wavelength. Thus, the spectrum of spatial frequencies in the record diffracted by the long wavelength illuminating radiation will be centered about a spatial carrier spaced farther from the diffraction pattern axis than the record spatial frequency spectrum carried on a spatial carrier produced by shorter wavelength radiation.

Also, again because of the dependence of the diffraction angle on the wavelength of the illuminating radiation, the diameter of the diffraction orders for a given value of $\omega_s$ is dependent on the wavelength of the illuminating radiation.

It has been found that the bandwidth of record spatial frequencies available for retrieval actually is substantially greater than would be dictated by the sampling theorem; namely, a bandwidth of frequencies exceeding one-half of the spatial frequency of the sampling modulation. It should be appreciated from the above, however, that the bandwidth of spatial frequencies which may be detected by prior art spatial filtering techniques is appreciably less than one-half the sampling modulation frequency. There are a number of reasons for this. First, structural limitations are imposed on the spatial filter if the filter is to be formed, for example, by a photoetching process; a supporting web must be left between the openings passing the selected diffraction orders. An interstitial area between the orders is also necessary to allow for the spherical and longitudinal chromatic aberrations produced by the transform lens (lens 30 in the FIG. 9 system). Thus, the maximum bandwidth of spatial frequencies which may be detected by prior art techniques without introducing crosstalk is considerably less than one-half the spatial frequency of the sampling modulation impressed upon the record.

DESCRIPTION OF THE PREFERRED EMBODIMENTS

Figures 2, 3, 4:
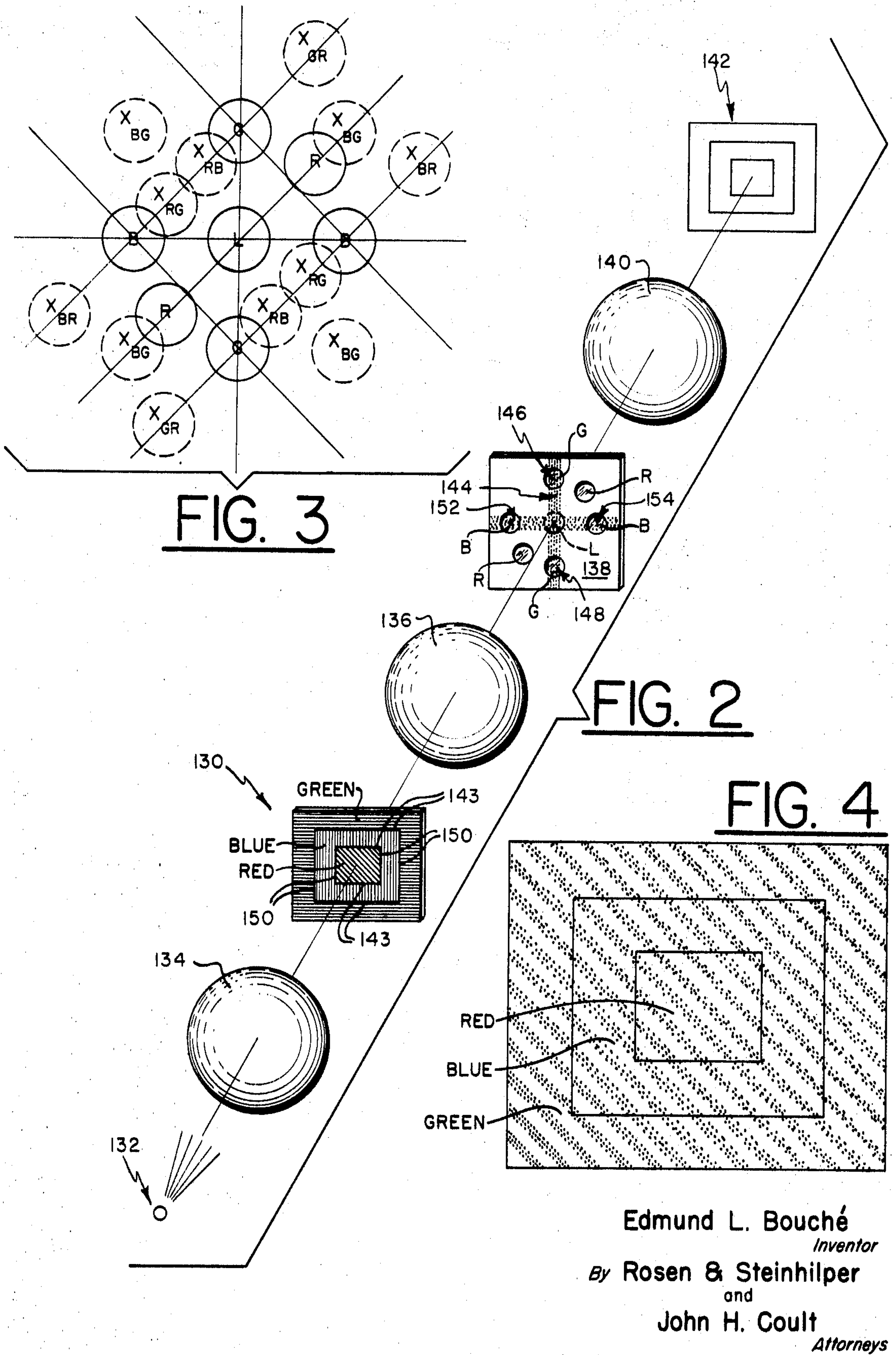
FIG. 2 is a schematic perspective view of a coherent optical projection system for retrieving color information from carrier-encoded monochrome records, illustrating the manner in which geometrical patterns and edges in the photographed scene record can introduce false coloring effects in reconstructed images.
FIG. 3 illustrates schematically a diffraction distribution which might occur in a Fourier transform space in a projection system such as is shown in FIG. 2, the diagram illustrating the relationship of crosstalk energy to color channel energy and the causes of moiré patterns in reconstructed images.
FIG. 4 represents a reconstructed image of the record shown in FIG. 2 as it might appear degraded by a moiré pattern produced by the beating of color channel and crosstalk energy.

The above principles will aid in an understanding of the color TV film reproduction system with which this invention is concerned and the relationship of the subject invention with respect thereto. FIg. 2 depicts the optical system for the film reproduction system, comprising a projector stage 36 and a camera stage 38. Light source means for the system produce a plurality of sources of spatially coherent light for establishing a plurality of diffracted color channels and a source of less coherent light for establishing a luminance channel through the system, as more fully described hereinafter. To this end, light source means 40 comprises a projector lamp 42 having an arc 44 providing an intense source of luminous radiation of limited size. A spherical reflector 46 for collecting radiation from the arc 44 is disposed on the system axis and has its center of curvature at the arc 44. The reflector 46 is rotated slightly about an optical axis transverse to the system such that the image of the arc is displaced slightly from the arc itself, resulting in a substantial increase in luminous output.

A condensing lens 48 converges the light from the arc 44 toward the center of the film gate 50. A lenticular lens array 52 consisting (in the illustrated embodiment) of nine short focal length (for example, 7 mm.) spherical lenses arranged in a square geometry (see FIG. 1A). The lenses comprising the array 52 are illustrated as being truncated square and cemented together.

Figures 1, 1A, 1B, 1C, 1D, 1E, 1F, 1G, 1H:
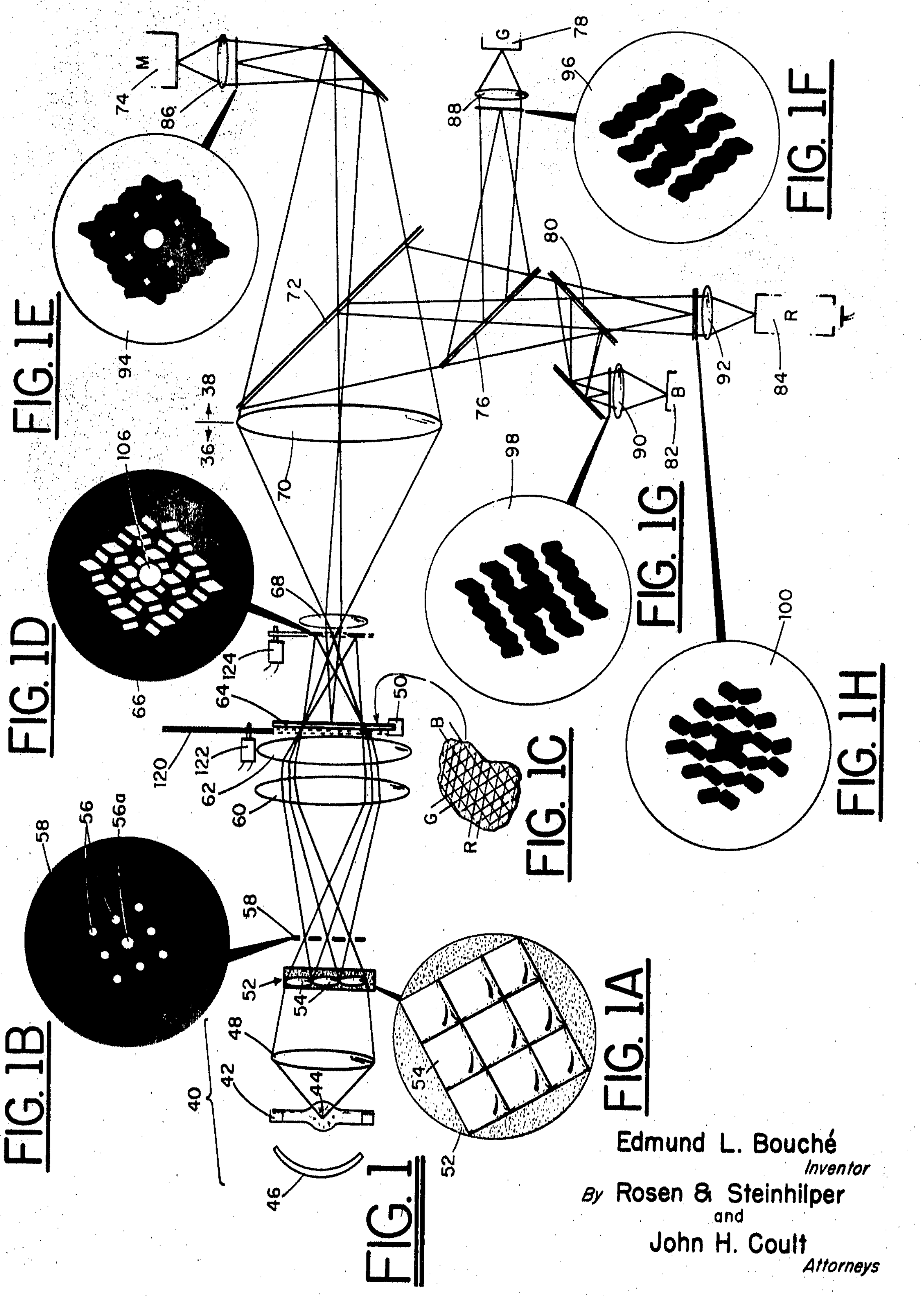
FIG. 1 is a schematic side elevation view of the optical system of a parallel monochrome color TV film reproduction system with which this invention is concerned.
FIG. 1A is a front elevation view of a rectangular array of condensing lenses shown in side elevation in FIG. 1.
FIG. 1B is a front elevation view of an apertured mask comprising part of light source means shown in FIG. 1.
FIG. 1C is a front elevation fragmentary view of a hypothetical monochrome record containing color separation information modulating azimuthally distinct spatial carriers.
FIG. 1D is a front elevation view illustrating a spatial filter located in a Fourier transform space established within the FIG. 1 optical projection system.
FIGS. 1E, 1F, 1G, and 1H represent front elevation views of light-blocking masks for filtering light transmitted to monochrome, green, blue, and red detecting vidicon tubes, respectively, as taught by this invention. Each of FIGS. 1A—1H represent views of elements as they would appear if looking toward the light source.

Converging light from the condensing lens 48 is received by the lenticular array 52, producing a square pattern of small arc images mating with and filling a corresponding array of pinholes 56 in mask 58 to produce nine sources of coherent light. FIG. 1B is a frontal view of mask 58. One of the pinholes **56*a*** is intentionally made larger than the others in order to establish a source of less coherent light, for reasons to be discussed hereinafter.

The light emanating from the pinholes 56 is collected by a collimating lens 60 and a transform lens 62 which produce a converging light bundle at the film gate 50. In the illustrated embodiment wherein the film gate 50 is illuminated with converging light, the film gate is effectively illuminated by nine virtual sources in the far field of the film gate. The gate may be illuminated with collimated light to produce an exact Fourier transform of a record 64 in the film gate 50 at a Fourier transform plane in the system, however, it has been found that the use of converging light is more efficient and the consequent formation of an approximate Fourier transform produces no degradation in the reconstructed images.

The Fourier transform of the record 64 is formed in a Fourier transform space located at the back focal plane of the transform lens 62. In the illustrated embodiment the record 64 contains green information modulating a spatial carrier whose direction vector is oriented at 26° to a horizontal 0° reference (looking toward the light source), red information modulating a spatial carrier whose direction vector is oriented at 116° (see FIG. 1C). Thus, the diffraction spectra associated with the green, red, and blue information will be diffracted in the transform space along axes oriented at 26°, 71°, and 116°, respectively. The particular orientation of the carrier vectors and projector components as described constitutes a principal aspect of this invention and will be described in detail below after completion of this background discussion.

The arrangement of the lenticular array 52, mask 58, carriers, and lenses 60 and 62 are such that the fundamental harmonic orders carrying the red, blue, and green color separation information associated with each of the nine sources overlaps in the transform space. The overlap is such that first order red diffraction spectra produced by one source overlaps a first order red diffraction spectra produced by an adjacent source. Similarly, blue and green first order spectra are also caused to overlap in the transform space.

A spatial filter 66, shown in FIG. 1D, is effective to block the zeroth order DC information associated with each of the nine sources, except that produced by the central luminance channel source (for reasons to be described below), and to pass first order red, blue and green color separation information with as little transmission of crosstalk as possible.

A projection lens 68 collects light transmitted through the spatial filter 66, forming an image of the record 64 at a field lens 70 constituting the input element for the color television camera stage 38 of the film reproduction system.

Within the TV camera stage 38 a beamsplitting mirror 72 amplitude divides the converging light bundle from the field lens 70, passing part of the beam to a high resolution monochrome vidicon tube 74 and reflecting the remaining portion of the light bundle to the color detection section of the camera. In the color detection section a first dichroic mirror 76 reflects green light to a green-detecting vidicon tube 78, transmitting blue and red light to a second dichroic mirror 80. The second dichroic mirror 80 reflects blue light to a blue-detecting vidicon 82, transmitting red light to a red-detecting vidicon tube 84. The record image formed by the projection lens 68 at the field lens 70 is reimaged onto the monochrome, green, blue, and red vidicon tubes 74, 78, 82, and 84 by lenses 86, 88, 90 and 92, respectively. For reasons which will be fully described below, the field lens is color corrected and of extraordinary quality, serving to form images of the spatial filter 66 in front of the lenses 86, 88, 90, and 92, respectively, at the locations of which images are placed novel light blocking masks 94, 96, 98, and 100, shown individually in FIGS. 1E—1H. The construction and function of these light blocking masks will be treated in some detail below.

Signals generated within the vidicon tubes 74, 78, 82, and 84 are sent through leads to conventional signal processing circuitry (not shown). The signal processing circuitry performs the functions of amplification, matrixing, and other conventional electronic TV signal processing operations.

The subject color television film reproduction system has a distinct luminance information channel carrying a wideband of spatial frequencies available for processing in the camera chain separately from the channels associated with the color information. The provision of a wideband luminance channel enables the production of images of greater resolution, enhanced brightness, and higher signal-to-noise ratios than is possible if color channels alone are combined to produce luminance information.

It has been found that the use of a light source with high spatial coherence produces images having a random noise effect, appearing as a speckling on the displayed images. This speckling effect is a result of random amplitude and phase perturbations of the illuminating wavefronts due, inter alia, to random defects in the recording medium. The provision of a separate luminance channel having substantially less spatial coherence than the color channels has the advantage that the speckling effect is swamped by the addition of the more uniform luminance channel energy. In the disclosed system a wideband luminance channel is combined with a plurality of more spatially coherent channels transmitting color information on spatial carriers. Referring now to FIG. 1 and attendant FIGS. 1B and 1C, the combination of a luminance channel with a plurality of more spatially coherent channels is accomplished by providing an intensely illuminated pinhole 56a of substantially larger size than pinholes 56 in mask 58. Although the location and origin of the enlarged source is to a certain extent arbitrary, in the illustrated arrangement one of the pinholes 56 in mask 58 is enlarged to serve as a source of substantially less coherent light for the luminance channel.

There are a number of factors which influence the decision as to which of the pinholes 56 shall be selected to provide the enlarged source for the wideband channel—among these are: sacrifice of color energy caused by necessary spatial filtering in the transform plane, utilization of the optimum modulation transfer functions of the system optical elements, and symmetry in the luminance and color channels. In the described system the desirability of maintaining an optimum net modulation transfer function (MTF) and minimizing vignetting leads to the selection of the central pinhole as the one which should be enlarged to provide the source for the luminance channel. FIG. 1B shows the enlarged central pinhole 56a in mask 58 implementing this choice. In the transform plane spatial filter 66 (see FIG. 1D) is provided with a large central aperture 106 for passing a bandwidth of spatial frequencies substantially greater than the bandwidth of any of the diffracted color channels transmitted through the array of apertures surrounding the central aperture 106.

In the illustrated embodiment, means are provided for rendering unnecessary any spectral filtering at the Fourier transform plane, as is required in the prior art systems (see especially FIG. 9), and for obviating the need for dichroic mirrors in the camera chain. The illustrated film reproduction system exploits the fact that the field lens 70 forms an image of the spatial filter 66 in front of each of the vidicons. By blocking with blocking masks 94, 96, 98, and 100 different portions of each of the filter images thus formed, each vidicon is caused to "see" only the color separation (or luminance) distribution which it is assigned to detect. FIGS. 1F, 1G, and 1H depict blocking masks 96, 98, and 100 designed to block all energy except the green color separation image, the blue color separation image, and the red color separation image, respectively. A comparison of the blocking masks 96, 98, and 100 with the spatial filter 66 will clearly indicate the manner in which the opaque mask patterns respectively absorb substantially all energy except that which defines the distribution which the associated vidicon is assigned to detect. The opaque mask patterns on the blocking masks represent partial images of the spatial filter 66 which are slightly enlarged in order to: (1) more effectively block crosstalk energy which would otherwise be transmitted, (2) allow for lens imperfections, and (3) introduce some mechanical and alignment tolerances.

A similar blocking mask 94 (see FIG. 1E) blocks all color channel energy and transmits only the zeroth order luminance channel distribution to the monochrome vidicon tube 74. Whereas it may at first impression appear that zeroth order color channel energy will be transmitted through clear areas on each of the blocking masks, it must be remembered that the spatial filter 66 prevents all zeroth order color channel energy from passing beyond the Fourier transform space.

The blocking masks may be fabricated in any of a great number of ways—one satisfactory method involves deposition of opaque patterns on a clear glass base material.

Thus, it becomes evident that although dichroic mirrors 76 and 80 as found in conventional parallel monochrome color television cameras may be utilized, they are rendered unnecessary by the use of blocking masks 94, 96, 98 and 100 and may be replaced by conventional beamsplitting mirrors.

It is desirable to have a compatible color TV film reproduction system which is capable of being used to reproduce images in color from either conventional color transparency records or monochrome records on which color separation information is carried on spatial carriers. By the utilization of blocking masks 94, 96, 98, and 100, which during projection of a conventional color transparency subtract only a small amount of energy which would otherwise reach the respective vidicon tubes, no alteration of the camera stage is necessary to convert from color transparency projection to diffraction process projection of monochrome records.

However, in the film projector, it is desirable to illuminate the film gate with diffuse incoherent light when color transparencies are projected. To this end, FIG. 1 shows a diffuser 120 mounted for rotation into or out of the system by a rotary solenoid 122, as described in detail hereinafter. The system is shown in its operative mode for reproducing color images by diffraction process from a monochrome record. Thus, the diffuser 120 is shown in its inoperative position. The only other modification to the system to convert from one mode of operation to the other concerns the spatial filter 66. The spatial filter 66 is useful only in connection with diffraction process projection and would block a substantial amount of light if used during projection of conventional color transparencies. Means 124 are normally provided for alternately positioning the filter 66 either within or without the system depending on whether conventional or diffraction process projection is desired.

This invention is directed to the minimization of image degradation effects in diffraction process color systems, particularly color distortions due to false color encoding by edges and patterns in photographed scenes and moiré effects produced by beating of color channel energy and crosstalk.

The false coloring problem may be more clearly understood by reference to FIG. 2 which shows very schematically a coherent optical projector for reconstructing full color aerial images from a monochrome record 130 on which color information is encoded with spatial carriers as described above. The FIG. 2 projector is illustrated as comprising a very small source 132 of high intensity radiation, a collimating lens 134, a transform lens 136, a filter 138 located at a Fourier transform space at which a plurality of images of the source 132 are formed, a projection lens 140 and an output plane 142 at which a full color aerial reconstruction of the photographed scene is erected. The lenses 134, 136, and 140 and the filter 138 are analogous to the lenses 28, 30, and 32 and the filter 31 in FIG. 9.

The record 130 in FIG. 2 carries green color separation information on spatial carriers having a vertical direction vector, blue color separation information on spatial carriers having a horizontal direction vector, and red color separation information on spatial carriers having a direction vector at 45°. In the Fourier transform space formed in the FIG. 2 system the spectral orders carrying blue scene information will lie on a horizontal axis, the orders carrying green scene information will lie on a vertical axis, and the orders carrying red scene information will lie on a 45° axis.

It is seen from FIG. 2 that if a scene record such as the record 130 contains edges or periodic patterns of lines or edges which lie parallel to the direction of a spatial carrier, then upon projection such lines or edges will act, in effect, as false carriers diffracting light through the openings in filter 138 reserved for color channel energy. For example, in FIG. 2 the scene record 130 contains a repetitive pattern of horizontal edges 143 which lie parallel to the horizontal lines constituting the green information carriers. Upon reconstruction, these horizontal edges will diffract light in a vertically extending distribution 144 in the Fourier transform space. Some of the energy in the distribution 144 will pass through the openings 146, 148 in the filter 138 reserved for pure green color separation information. As a result of this adulteration of the green color separation information the horizontal pattern of edges 143 will have a greenish cast in the colored image reconstructed at the output plane 122.

Similarly, the repetitive pattern of vertical edges 150 in the scene record 130 will act as false blue information carriers, diffracting light through the openings 152, 154 in filter 118 reserved for blue color channel energy. Thus, the vertical edges 150 will have a bluish cast in reconstructed images.

The second image degradation problem with which this invention is concerned can best be understood by reference to FIG. 3. FIG. 3 illustrates the distribution at the Fourier transform space in the FIG. 2 system, but includes representations of crosstalk energy which appears along with the pure color channel energy. In FIG. 3, the particular spots representing crosstalk are shown circumscribed by broken lines and are labeled to designate the origin of the crosstalk term. For example, the spots labeled $X_{GR}$ represent crosstalk between the green and red color channels.

It is evident from an examination of the FIG. 3 distribution that if a reasonably broad bandwidth of frequencies is to be passed in each of the color channels, then a certain amount of the crosstalk energy which overlaps the color channel must also be passed. For example, the red color channels are overlapped by a crosstalk between the blue and green color channels. This energy, in addition to desaturating the red color separation information beats with the red color channel energy (with which it is coherent), producing a band of 45° moiré fringes in the reconstructed image. FIG. 4 is an exaggerated schematic representation of moiré beats produced by this interference between crosstalk and color channel energy.

It should be noted that in all cases the beating of color channel and crosstalk energy produces fringes having the same orientation and frequency.

It should also be noted that the spacing of the crosstalk order from the color channel order which it overlaps governs the frequency of the moiré beats which are produced at the output plane. It can be calculated, for example, that if 40 cycle per millimeter spatial carriers are used, the moiré fringes on the same scale will be at a frequency of approximately 17 cycles per millimeter.

By this invention it has been found that each of these image degradation effects can be minimized by a selection of certain spatial carrier angles and orientation of the spatial filter which is used to detect the color channels in the Fourier transform space established within the projection system. It has been concluded that for normal photographic subjects, edges and periodic patterns of lines or edges occur predominantly in either the horizontal or vertical directions. By this invention, during the recording process the azimuthal orientations of the carrier-producing gratings are carefully selected: (1) to minimize the described false color-coding effects, and (2) at the same time to cause the described moiré fringes to be visually less obtrusive.

As applied to a color TV film reproduction system such as is shown in FIG. 1, the effect of raster lines produced on the face of a TV receiver must be considered. It has been discovered that if the moire fringes are caused to be reasonably close to parallelism with the raster lines, they become much less noticeable to the viewer.

I have found that rotation of the color-encoding carriers and spatial filter by 25°—30° from the 0°, 45°, 90° geometry shown in FIG. 2 produces an optimum result in the FIG. 1 film reproduction system. It should be understood, of course, that different optimum geometries can be selected in accordance with the principles of this invention for other diffraction process systems.

Figures 5, 6:
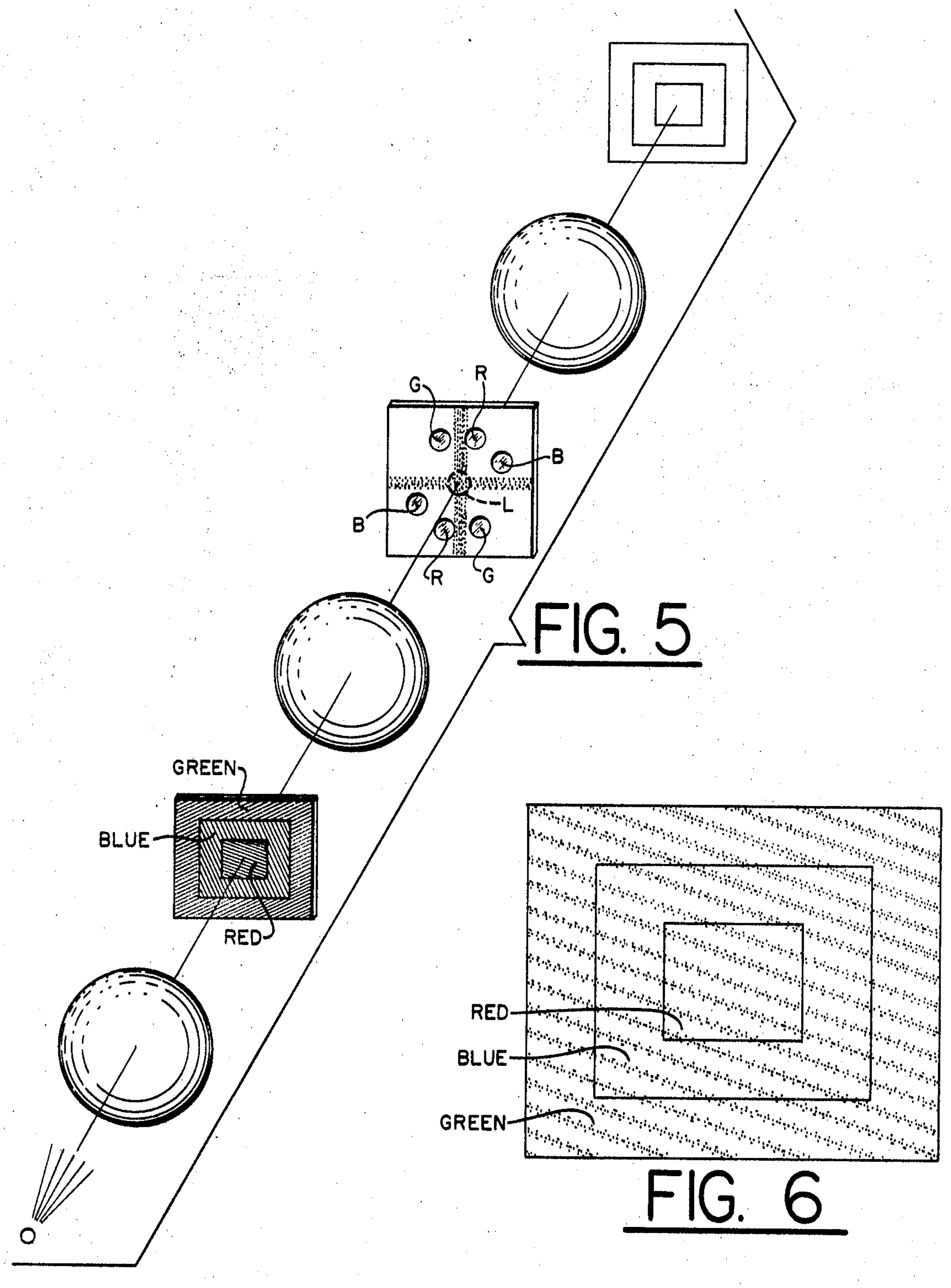
FIG. 5 illustrates a monochrome color-encoded record made in accordance with the teachings of this invention located in a coherent color projection system similar to the FIG. 2 system but modified according to this invention to produce improved color reconstructions.
FIG. 6 represents a reconstructed image of the photographic record shown in the FIG. 5 projector, illustrating the effect of utilizing the invention to lessen visible image degradation attributable to moiré patterns.

FIG. 5 illustrates a coherent projection system similar to the FIG. 2 system but incorporating the principles of the invention. By way of example, the green, blue, and red color-encoding carriers have each been rotated 26° counterclockwise (looking toward the light source). In the Fourier transform space, the array of spatial filter openings have also been rotated by 26° in the same direction. The effect is to minimize the passage of energy diffracted from the predominantly horizontal and vertical patterns of lines in the scene record through the spatial filter openings to the output plane. Thus, by this invention false color coding effects produced by edges and patterns in recorded scenes is greatly reduced.

At the same time, rotation of the spatial carrier geometry reduces the angle (with respect to the horizontal) of the moire fringes produced in the output plane, as shown schematically in FIG. 6, causing them to approach parallelism with the TV raster lines and to be much less noticeable.

The invention is not limited to the particular details of construction of the embodiments depicted, and it is contemplated that various and other modifications and applications will occur to those skilled in the art. Therefore, because certain changes may be made in the above-described apparatus without departing from the true spirit and scope of the invention herein involved, it is intended that the subject matter of the above depiction shall be interpreted as illustrative and not in a limiting sense.

I claim:

1. A method of spectral zonal photography, comprising:

exposing a photosensitive material responsive to radiation in all spectral zones desired to be recorded to an additive super-position of spectral separation images formed in radiation propagating from a photographed scene in at least three different zones of the electromagnetic spectrum;

during the said exposure operation, causing a periodic grating function to be multiplied with each of said separation images but at a predetermined different azimuthal line orientation for each image, the said azimuthal line orientation of the grating function associated with each of said separation images making a substantial angle with respect to horizontal and vertical lines in the photographed scene; and developing the exposed photosensitive material to form a record containing said separation images respectively modulating azimuthally distinct spatial carriers each making a substantial angle with respect to scene horizontal and vertical lines.

2. A method of spectral zonal photography, comprising:

exposing a photosensitive material responsive to radiation in all spectral zones desired to be recorded to a scene multiplied with a spectral zonal encoder comprising at least three mutually coextensive, azimuthally distinct periodic arrays of filter elements each having a preferential absorption for a different spectral zone, each of said periodic arrays of filter elements making a substantial angle with respect to horizontal and vertical lines in the photographed scene; and developing exposed photosensitive material to form a record containing said separation images respectively modulating azimuthally distinct spatial carriers.

3. A method of color photography using monochrome or other recording materials which do not exhibit, when developed, recorded color values in color, comprising:

exposing a photosensitive material responsive to radiation in all spectral zones desired to be recorded to a scene multiplied with a spectral zonal filter comprising mutually coextensive, periodic arrays of cyan, yellow, and magenta filter elements arranged in a substantially 0°, 45°, 90° geometry relative to each other, said geometry being given an angular displacement in the range of 0° to 45° relative to the exposed scene image such that each of said arrays of filter elements makes a substantial angle with respect to horizontal and vertical lines in the photographed scene, whereby horizontal or vertical lines or patterns in the scene will not function to introduce a false color coding of the scene image; and developing said photosensitive material to form a record containing red, blue, and green color separation images respectively modulating azimuthally distinct spatial carriers.

4. A method as defined by claim 3 wherein said range is 25°—30°.

5. A method of color photography for recording color scenes on monochrome or other recording materials which do not exhibit, when developed, recorded color values in color, comprising:

locating at a recording plane a photosensitive material responsive to radiation in all spectral zones desired to be recorded;

effecting a multiple exposure of said photosensitive material by, in succession, forming an image of said photographic object on said photosensitive material in radiation in each of a plurality of spectral zones to which said photosensitive material is responsive;

during each of said multiple exposures of said photosensitive material, locating at said recording plane a grating having a spatial frequency resolvable by said photosensitive material;

during each exposure of said photosensitive material, causing the grating to have a different relative azimuthal orientation but an azimuthal orientation which makes a substantial angle with respect to horizontal and vertical lines in the photographed scene; and developing the multiple latent color separation images thus formed in said photosensitive material to produce a record containing a plurality of additively superimposed color separation images each of which modulates a spatial carrier having a different azimuthal orientation.

6. A method of spectral zonal photography and reconstruction, comprising:

exposing a photosensitive material responsive to radiation in all spectral zones desired to be recorded to an additive superposition of spectral separation images formed in radiation propagating from a photographed scene in at least three different zones of the electromagnetic spectrum;

during the said exposure operation, causing a periodic grating function to be multiplied with each of said separation images but at a predetermined different azimuthal line orientation for each image, the said azimuthal line orientation of the grating function associated with each of said separation images making a substantial angle with respect to horizontal and vertical lines in the photographed scene;

developing the exposed photosensitive material to form a record containing said separation images respectively modulating azimuthally distinct spatial carriers angled with respect to scene horizontal and vertical lines;

locating the developed record in a beam of light which is substantially coherent;

forming in a Fourier transform space a diffraction pattern of said record including a plurality of angularly separated Dirac delta function arrays, each array being convolved with a spectrum of spatial frequencies characterizing a different one of said spectral separation images;

selectively transmitting through aperture means in a spatial filter located in said Fourier transform space at least one spectral order of said spatial frequency spectra associated with each of said spectral separation images, said aperture means being located along the direction vectors of each of said periodic arrays of filter elements such that light diffracted from horizontal and vertical lines and patterns in the scene record will be substantially blocked by said spatial filter means to minimize false coloring effects in reconstructed scene images;

causing the radiation passed through said transform space in each of said spectral orders to have a mean wavelength consonant with the color separation information carried; and retransforming said transmitted spectra to thus produce at an output a full spectrum aerial reconstruction of the photographed scene.

7. A method of spectral zonal photography and reconstruction, comprising:

exposing a photosensitive material responsive to radiation in all spectral zones desired to be recorded to a scene multiplied with a spectral zonal encoder comprising at least three mutually coextensive, azimuthally distinct periodic arrays of filter elements each having a preferential absorption for a different spectral zone, each of said periodic arrays of filter elements making a substantial angle with respect to horizontal and vertical lines in the photographed scene;

developing the exposed photosensitive material to form a record containing said separation images respectively modulating azimuthally distinct spatial carriers;

locating the developed record in a beam of light which is substantially coherent;

forming in a Fourier transform space a diffraction pattern of said record including three angularly separated Dirac delta function arrays, each array being convolved with a spectrum of spatial frequencies characterizing a different one of said spectral separation images;

selecting transmitting through aperture means in a spatial filter located in said Fourier transform space at least one spectral order of said spatial frequency spectra associated with each of said spectral separation images, said aperture means being located along the direction vectors of each of said periodic arrays of filter elements such that light diffracted from horizontal and vertical lines and patterns in the scene record will be substantially blocked by said spatial filter means to preclude false coloring effects in reconstructed scene images;

causing the radiation passed through said transform space in each of said spectral orders to have a mean wavelength consonant with the color separation information carried; and retransforming said transmitted spectra to thus produce at an output plane a full spectrum aerial reconstruction of the photographed scene.

8. A method of color photography and reconstruction using monochrome or other recording materials which do not exhibit, when developed, recorded color values in color, comprising:

erecting a full-color aerial image of a scene to be photographed at an image plate;

locating a color encoding filter at said image plane so as to be multiplied with said scene image, said filter comprising mutually coextensive periodic arrays of cyan, yellow, and magenta filter elements arranged in a substantially 0°, 45°, 90° geometry relative to each other, said geometry being given an angular displacement in the range of 0° to 45° relative to the exposed scene image such that each of said arrays of filter elements makes a substantial angle with respect to horizontal and vertical lines in the photographed scene, whereby horizontal or vertical lines or patterns in the scene will not function to introduce a false color coding of the scene image;

exposing a photosensitive material to said image multiplied with said filter;

developing said material to form a record of said scene in which red, blue, and green color separation images are effectively impressed on spatial carriers angled with respect to scene horizontal and vertical lines and defining a 0°, 45°, 90° geometry relative to each other;

locating the developed record in light which is substantially coherent;

forming in a Fourier transform space a diffraction pattern of said record including three angularly separated Dirac delta function arrays respectively convolved with spectra of said red, blue, and green color separation images;

selectively transmitting through aperture means in a spatial filter located in said Fourier transform space at least one spectral order of said spatial frequency spectra associated with each of said spectral separation images, said aperture means being located along the direction vectors of each of said periodic arrays of filter elements such that light diffracted from horizontal and vertical lines and patterns in the scene record will be substantially blocked by said spatial filter means to preclude false coloring effects in reconstructed scene images; and causing the light carrying said red, blue, and green color separation information to be predominantly red, blue, and green respectively, whereby a full color aerial reconstruction of said scene is produced.

9. A method as defined by claim 8 wherein said range is 25° to 30°.

10. A method of color photography and reconstruction using monochrome or other recording materials which do not exhibit, when developed, recorded color values in color, comprising:

locating at a recording plane a photosensitive material responsive to radiation in all spectral zones desired to be recorded;

effecting a multiple exposure of said photosensitive material by, in succession, forming an image of said photographic object on said photosensitive material in radiation in each of a plurality of spectral zones to which said photosensitive material is responsive;

during each of said multiple exposures of said photosensitive material, locating at said recording plane a grating having a spatial frequency resolvable by said photosensitive material;

during said exposure of said photosensitive material, causing the grating to have a different relative azimuthal orientation but an azimuthal orientation which defines a substantial angle with respect to horizontal and vertical lines in the photographed scene;

locating the developed record in a beam of light which is substantially coherent;

forming in a Fourier transform space a diffraction pattern of said record including three angularly separated Dirac delta function arrays, each array being convolved with a spectrum of spatial frequencies characterizing a different one of said color separation images;

selectively transmitting through aperture means in a spatial filter located in said Fourier transform space at least one spectral order of said spatial frequency spectra associated with each of said color separation images, said aperture means being located along the direction vectors of each of said periodic arrays of filter elements such that light diffracted from horizontal and vertical lines and patterns in the scene record will be substantially blocked by said spatial filter means to preclude false coloring effects in reconstructed scene images;

retransforming said transmitted spectra;

causing the radiation passed through said transform space in each of said spectral orders to have a mean wavelength consonant with the color separation information carried; and retransforming said transmitted spectra to erect at an output plane a full-color aerial reconstruction of the photographed scene.

11. In a color TV film reproduction system for enabling the televising of full-color displays from a record containing three superimposed color separation orientation, each modulating a spatial carrier at a predetermined different azimuthal orientation, the said azimuthal orientation of the spatial carrier associated with each of said separation images making a substantial angle with respect to horizontal and vertical lines in the photographed scene, a system comprising:

a film gate for holding a record;

light source means for providing a plurality of effectively far-field sources of light which is substantially spatially coherent at said film gate, said sources being separated in a predetermined distribution with respect to a system optical axis;

lens means for forming in a Fourier transform space a distribution comprising a like plurality of diffraction patterns of a record in said film gate, each of said diffraction patterns comprising three Dirac delta function arrays angularly separated in accordance with the angular separation of the direction vectors of said spatial carriers associated with said color separation images, said Dirac delta function arrays being respectively convolved with color separation spectra produced by the corresponding color separation images;

mask means in said Fourier transform space defining openings located to pass a fundamental diffracted order associated with each of said Dirac delta function arrays at each of said plurality of diffraction patterns, said openings being aligned along the direction vectors associated with said spatial carriers and thus with the directions of said Dirac delta function arrays produced by each of said color separation images, whereby light diffracted from horizontal and vertical lines and patterns in the scene record will be substantially blocked by said mask means to preclude false coloring effects in reconstructed scene images;

means for causing the radiation passed by said mask means in each of said spectral orders to have a mean wavelength consonant with the color separation information carried; and retransforming said transmitted spectra to thus produce at an output plane a full-color aerial reconstruction of the photographed scene.